United States Patent [19]

Lee

[11] Patent Number: 4,739,533

[45] Date of Patent: Apr. 26, 1988

[54] MACHINE FOR SCRAPING OFF THE PLASTIC COATING OF A USED WIRE

[76] Inventor: Tocew Lee, 139, San Yuan Street, Taipei, Taiwan

[21] Appl. No.: 616,607

[22] Filed: Jun. 4, 1984

[51] Int. Cl.⁴ .............................................. A46B 13/02
[52] U.S. Cl. ............................... 15/88; 51/215 HM; 15/21 D
[58] Field of Search ............ 15/21 D, 21 E, 88, 93 R, 15/70; 51/103 R, 108 R, 215 HM, 215 AR, 215 M; 29/90 R

[56] References Cited

U.S. PATENT DOCUMENTS

| | | | |
|---|---|---|---|
| 2,170,672 | 8/1939 | Anderson | 51/215 HM |
| 3,045,268 | 7/1962 | Coan | 15/88 |
| 3,311,940 | 4/1967 | Spittler | 15/88 |

*Primary Examiner*—Edward L. Roberts
*Attorney, Agent, or Firm*—Asian Pacific International Patent Office

[57] ABSTRACT

The apparatus comprises a low speed feeding roller on which are provided teeth, and a high speed scraping roller on which are mounted steel brush wheels. In operation, the pre-cut used wires are fed into the apparatus and the coating is scraped off by the steel brush wheels to obtain substantially exposed copper wire.

6 Claims, 2 Drawing Sheets

MACHINE FOR SCRAPING OFF THE PLASTIC COATING OF A USED WIRE

BACKGROUND OF THE INVENTION

Field of the Invention

The demand for useful materials has increased as a function of progress made in developments at least since the beginning of the industrial revolution. As a consequence, this demand can now not always be met by mining and refining of elements, particularly metals. Thus, in line with the improved economics, and other factors, for example disposal concerns, greater attention is paid nowadays to efficient recycling of materials. Accordingly, separating and recovering component materials from industrial scrap and similar surplus materials has become a workable course of action in obtaining some industrial materials. However, the current methods for the recovery of metallic constituents from scrap material are presenting new problems. The currently practiced methods include:

(1) Manual Burning

In this, the used cable or wire is burned in open fields or somewhere else in the open. Such methods inherently contribute to serious air pollution and jeopardize public health due to production of toxic gases. At times, these procedures are restricted by corresponding government regulations.

Such burning methods have the additional drawbacks in that the quantity of the metal of interest that is to be recovered is rather small. Consequently, this method can not be used to efficiently and economically recover as large quantities of constituent components as would be desired. As well, they require a very large area for burning, leading to an uneconomical use in terms of space utilization.

During burning, copper wire itself will also be consumed and 30 to 50% of the copper may be lost.

(2) Mechanical Crushing

In this method toxic hazards are prevented; however, the crushed material would be associated with higher costs before it can be considered to represent a useful material, and this method is deemed uneconomical.

SUMMARY OF THE INVENTION

Mindful of the drawbacks of the aforesaid processing methods for recovering useful constituents from scrap materials, this invention is concerned with an apparatus for scraping off or similarly removing the coating of a used wire, usually a plastic coating. The apparatus allows feeding of used wire which has been cut, chopped, or similarly reduced in length, and subjecting such wire to the action of a feeding roller having a plurality of teeth for removal therefrom, or scrape off, the attendant plastic coating. Thus, close to 100% of the contained copper can be recovered without generation of toxic gases or similar air pollution.

Another feature of the present invention resides therein that the space or axial gap which is present between each pair of circumferential rows of gear-shaped and gear-defining teeth on the feeding roller is equal to the width of the steel brush wheel on the respective scraping roller.

The apparatus generally minimizes friction between the feeding roller and the steel brush wheel so as to increase the useful life of the associated components, and to prevent the copper wire from being disintegrated into copper powder, which may present handling problems in further downstream processing.

Included in the objects of the present invention are to provide an apparatus of simple configuration, but with a high scraping efficiency with respect to the plastic coating on the used wire, while precluding creation of public hazards and/or nuisances.

Furthermore, the invention has as its object to hold the copper recovery cost at a minimum.

DESCRIPTION OF THE DRAWINGS

The above and other objects, features and advantages of the invention will become apparent from the following description, reference being made to the accompanying drawings in which.

SPECIFIC DESCRIPTION

Figure 1:
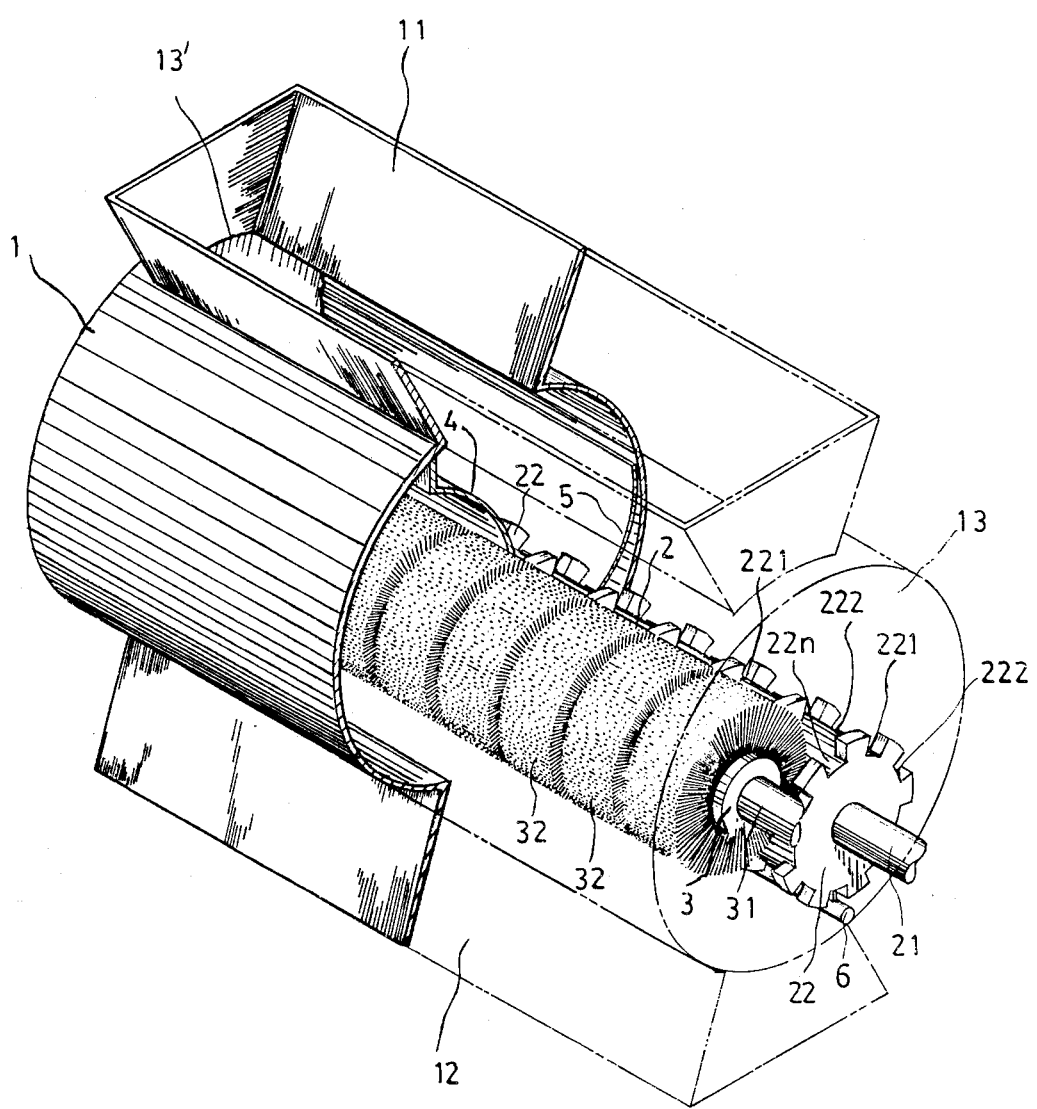
FIG. 1 is a perspective view of the apparatus in accordance with one embodiment of the present invention.

Referring to FIG. 1, there is shown a perspective view of the structure of an apparatus in accordance with my invention, in which the top of the outer case or housing 1 is provided with a funnel-shaped feeding port 11, while the bottom of the housing 1 is provided with a funnel-shaped outlet or outlet port 12.

In the walls 13 and 13' at the two ends of the housing 1, there are respectively formed two shaft port holes in which are mounted bearings, fixing parts, and seals, not shown because they are standard in the art, for mounting a conveying or feeding roller 2 and a scraping roller 3, respectively. The scraping roller 3 and the feeding roller 2 are mounted in parallel and in tangential manner, and they can be rotated in opposite direction with respect to one another.

The feeding roller 2 is mounted on a shaft 21, journaled as indicated above, and the shaft 21 may also be coupled to a drive motor, not shown. Distributed over the circumferential wall of the feeding roller 2 is a plurality of regularly spaced teeth 22 which are mounted so as to be securely fastened to the feeding roller 2. Furthermore, the corresponding gaps or pitches, identified by 221, 222, and 22n of the teeth 22 on the feeding roller 2 are axially aligned with respect to one another.

The respective ends of the shaft 31 are mounted as indicated above in the housing 1. The shaft 31 can be coupled, via a coupling means, not shown, to the drive motor. The scraping roller 3 has a plurality of steel brush wheels 32 mounted on its circumference. The number of steel brush wheels is equal to that of the rows of teeth 22.

The width of each steel brush wheel 32 is typically just equal to the space between two circumferential rows of teeth 22. The width of the space between two steel brush wheels 32 may be equal to, or larger than, the thickness of the teeth 22 so as to prevent the tops of the teeth 22 from interfering with the steel brush wheels 32 during operation of the apparatus.

Figure 2:
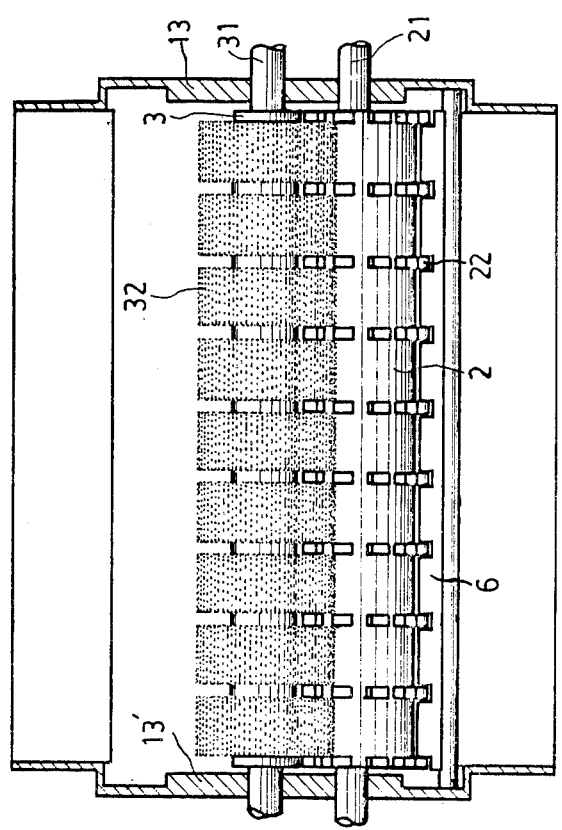
FIG. 2 is a sectional view of the embodiment shown in FIG. 1 in the direction of the longitudinal axis thereof.

Referring to FIG. 2, there is shown an axial crosssectional view of an embodiment of the present invention, in which the surface of the conveying roller 2 is in a tangential contact with the steel brush wheels 32 on the scraping roller 3 for the brush wheeels 32. As desired, a mounting ring may be provided for each brush wheel 32. At least one row of teeth 22 is positioned just between every two steel brush wheels 32. It is preferred that the sides of the teeth 22 do not touch the corresponding steel brush wheels 32, in order to minimize friction between the feeding roller 2 and the steel brush wheels 32. The steel brush wheels 32 are merely used for scraping off the palstic coating of a used wire without scraping off, or similarly abrading, the copper portion of a wire that is being treated.

Figure 3:
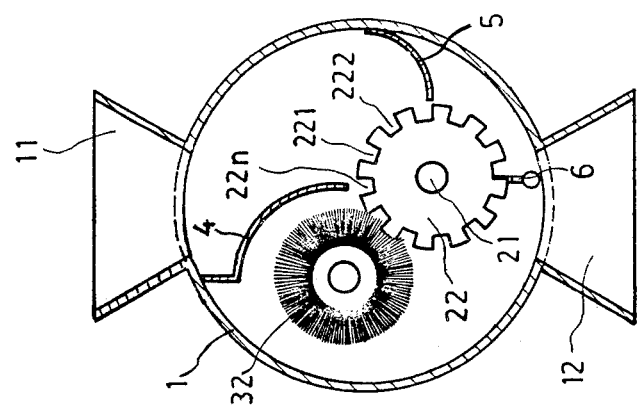
FIG. 3 is a sectional view of the embodiment shown in FIG. 1 in the perpendicular transverse plane with respect to the longitudinal axis thereof.

Referring to FIG. 3, there is shown a radial crosssectional view of an embodiment of the present invention. During operation, the used wire is to be cut into pieces having a length of 0.8 to 12". Such cut wire is fed with a conveyer, not shown, to the feeding port 11 for processing. Upon being fed into the apparatus, the used or cut wire will be moved towards one side of the feeding roller 2 as a result of an upper guard board 4. The cut wire or wires are then pushed by a lower guard board 5 into the aligned pitches (221, 222, 22n) between the teeth 22 (i.e. an axial groove) on the feeding roller 2. When the wire enters into an axial groove on the feeding roller 2, the used wire will be fed to, or into, the scraping roller 3 for the attendant scraping process.

Since the feeding roller 2 and the scraping roller 3 are tangentially touching each other, and rotating in opposite direction, and since the feeding roller 2 rotates at a very low speed, e.g. 5 to 20 rpm, whereas the scraping roller 3 rotates at a higher speed, e.g. 900 to 1400 rpm, the used wire in an axial groove may be scraped repeatedly. In the end, a substantially perfectly open or uncovered copper wire may be obtained out of the outlet 12. Any wire pieces on the feeding roller 2 not being dropped due to the weight of the wire itself will finally be removed by a tooth-shaped wire-pickup plate 6, which is tangentially contacted by the feeding roller 2. The removed wire will be dropped out of the outlet 12.

In order to thoroughly and completely scrape off any remaining plastic coating on the wire that has been processed through one apparatus of the present invention, the wire may be transferred via a conveyer, not shown, to another apparatus as just described for a further pass therethrough, so as to be subjected to a further scraping until obtaining a better open, uncovered or exposed copper wire.

It will be understood that the embodiment illustrated in the aforesaid Figures is merely used for describing the present invention, but not as limiting the present invention. Any structure or apparatus made with or without minor modifications but not deviating from the spirit, concept and features of the present invention is deemed as being included in the scope of the claims of my invention.

I claim:

1. An apparatus for removing the plastic coating from scrap wire, said apparatus comprising in combination:
   an outer case including a top and a bottom remote from said top, said top defining a feeding port and said bottom defining an outlet, and said outer case also including end walls which are each provided with at least two respective shaft holes;
   a feeding roller mounted in said outer case on a shaft that is journaled for rotation by a respective motor in the corresponding shaft holes in the end walls of said outer case;
   a plurality of teeth arranged on said feeding roller for rotation therewith, said plurality of teeth being arranged in radial rows, with each radial row being axially spaced at a predetermined distance to at least one adjacent radial row;
   a scraping roller mounted in said outer case on a shaft that is journaled for rotation by a respective motor in its respective shaft holes in the end walls of said outer case; and
   a plurality of steel brush wheels mounted on said scraping roller and adapted to be rotated therewith when said scraping roller is rotated;
   wherein said radial rows of teeth of said feeding roller and said steel brush wheels are axially and radially positioned with respect to one another to allow removal of the coating of scrap wire by said steel brush wheels upon scrap wire being conveyed by said teeth.

2. The apparatus according to claim 1, wherein the width of at least one steel brush wheel is a least equal to the axial distance between two radial rows of teeth, and wherein at least one steel brush wheel and the respective roller surface between at least two radial rows of teeth of said feeding roller are tangentially in operative contact with one another.

3. The apparatus according to claim 2, wherein at least one radial row of teeth is axially positioned between two steel brush wheels so as to preclude a substantial amount of frictional contact.

4. The apparatus according to claim 1, wherein the teeth of said feeding roller are aligned to form axial grooves.

5. The apparatus according to claim 4 and further comprising: for guiding used wire being fed into the apparatus to a respective straight axial groove, at least one guard board mounted near said top; and at least one guard board mounted near said at least one feeding roller.

6. The apparatus according to claim 1 and further comprising: a tooth-shaped wire-pickup plate mounted tangentially with respect to the outer surface of said feeding roller for removing copper wire adhering thereto.

* * * * *